United States Patent [19]

Graves et al.

[11] Patent Number: 4,541,249
[45] Date of Patent: Sep. 17, 1985

[54] CRYOGENIC TRAP AND PUMP SYSTEM

[76] Inventors: Clint Graves, 241 Heather Pl., Danville, Calif. 94526; Mario Marcon, 742 Debra St., Livermore, Calif. 94550

[21] Appl. No.: 675,526

[22] Filed: Nov. 28, 1984

[51] Int. Cl.⁴ .............................................. B01D 8/00
[52] U.S. Cl. ....................................... 62/55.5; 55/269; 62/268; 62/514 R
[58] Field of Search ............ 62/100, 268, 55.5, 514 R; 417/901; 55/269

[56] References Cited

U.S. PATENT DOCUMENTS

| | | | |
|---|---|---|---|
| 3,262,279 | 7/1966 | Moore, Jr. | 62/55.5 |
| 3,430,455 | 3/1969 | Stuart et al. | 62/6 |
| 3,525,229 | 8/1970 | Denhoy | 62/55.5 |
| 3,552,485 | 1/1971 | Le Jannou | 62/55.5 |
| 3,719,052 | 3/1973 | White | 62/55.5 |
| 4,278,499 | 7/1981 | Abramson et al. | 62/55.5 |
| 4,354,356 | 10/1982 | Milner | 62/55.5 |
| 4,361,418 | 11/1982 | Tscheppe | 62/55.5 |
| 4,432,208 | 2/1984 | Onuki et al. | 62/55.5 |

Primary Examiner—Ronald C. Capossela
Attorney, Agent, or Firm—Paul L. Hickman

[57] ABSTRACT

A cryogenic system adapted to trap or pump waste industrial gasses and characterized by a cryogenic assembly having a cryogenically cooled member sealed within an inner enclosure, a thermal switch assembly for injecting and removing gas from within the inner enclosure, and a flush assembly for removing the solid and liquid residues of the industrial gasses from the trap assembly. The inner enclosure may be covered with a sacrificial material such as copper to chemically react with the reactive gasses. The use of a thermal switch assembly permits rapid regeneration of the system because the cryogenically cooled member does not have to be shut down during the regeneration cycle.

8 Claims, 3 Drawing Figures

CRYOGENIC TRAP AND PUMP SYSTEM

BACKGROUND OF THE INVENTION

1. Field of the Invention

This invention relates generally to devices which trap and/or pump waste gasses from industrial processes, and more particularly to cryogenic traps or pumps (cryotraps or cryopumps).

2. Description of the Prior Art

Cryogenics deals with the production of low temperatures and the utilization of low temperature phenomenon. The cryogenic temperatures are generally considered to range from 123° K. to 0° K.

Gases used in cryogenic engineering are cooled to their boiling (or liquefying) points by three basic methods, namely liquid expansion, Joule-Thomson expansion, and expansion in an engine (refrigeration). After production, cryogenic liquids generally are stored in specially designed tanks using superinsulation or in Dewar vessels (double walled flasks having an evacuated space between them). Liquid air, oxygen, nitrogen, and even hydrogen can be kept for several hours in such vessels without further thermal protection. Liquid helium, however, has such a low heat of vaporization that it can be kept for any length of time only if the Dewar vessel is in turn surrounded by a similar, larger flask containing liquid nitrogen or liquid air.

For several industrial and research purposes, cryogenic pumps (cryopumps) are used to attain hard vacuums beyond the reach of mechanical pumps. Gasses will condense on a surface if the temperature is low enough, much as water vapor will condense a cold windowpane.

In one system an absorbent (such as silica gel) is bonded to the surface of a cryopanel. The pumping speeds of cryogenically cooled absorbents at very low pressure are sensitive to the amount absorbed, but independent of the depth of the absorbing material. The capacity of the material to absorb increases rapidly with decreasing temperatures. By cooling the absorbent to 77° K., all gasses except hydrogen, helium, and neon can be effectively trapped.

Cryotraps, which are closely related to cryopumps, are often used to trap gasses formed as a by-product of industrial processes. A typical cryotrap of the prior art includes a liquid nitrogen refrigeration system which chills a condensation surface to cryogenic temperatures. The waste industrial gasses condense on the condensation surface, and are periodically removed therefrom in a flushing process.

A problem with the old liquid nitrogen cryotrap technology is that it consumes large quanities of liquid nitrogen, requiring frequent deliveries of that substance. Furthermore, the plumbing and facilities required to house the nitrogen are bulky and expensive.

The relatively new technology of helium cryopump refrigeration solves some of the problems of the old nitrogen cryotrap systems, but presents a few new ones of its own. A helium cryo refrigeration system includes a cold head through which high pressure gaseous helium is circulated. Typically, a compressor provides gaseous helium to the cold head at approximately 250 PSI, and recycles the effluent.

The helium cryo refrigeration system is advantageous over the old nitrogen systems in that the helium is constantly regenerated, eliminating the need for large storage vessels and frequent deliveries. Disadvantages of the helium systems include that they require many hours to reach cryogenic temperatures, and thus are not well suited for use in cryotraps which have to be periodically shut down for regeneration. Also, the helium system is not compatible with highly reactive gasses such as chlorine due to the characteristics of the materials used in the construction of the cold head and the associated condensation surfaces.

A solution to these problems would be to provide a thermal switch which insulates and protects the helium cold head from the condensation surface. One such thermal switch is disclosed in U.S. Pat. No. 3,525,229 of Denhoy which includes an inner vessel filled with liquid helium, and an outer vessel which may be selectively filled with a liquefied gas or evacuated with a vacuum pump. When the outer vessel is filled with the gas, the heat is conducted from the condensation surface via the liquefied gas to the liquid helium. When the outer vessel is evacuated the condensation surface is effectively insulated from the liquid helium.

In U.S. Pat. No. 4,432,208 of Onuki et al., a cold trap for liquid sodium is disclosed which has a double walled structure providing a volume 16 which may be filled with a heat insulating gas. U.S. Pat. No. 4,354,356 of Milner, teaches a temperature cycled cold trap provided with temperature sensors in a feed back mechanism. While the above identified patents teach useful cryogenic subassemblies, the prior art does not disclose a complete helium cryotrap system.

SUMMARY OF THE INVENTION

An object of this invention is to provide a cryotrap or cryopump which combine the best features of the old liquid nitrogen trap technology with the relatively new technology of helium cryopump refrigeration systems, and which are compatible with reactive gasses.

A further object of this invention is to provide a helium cryotrap or cryopump which has a short down time for regeneration.

Yet another object of this invention is to provide a novel thermal switch for cryogenic applications.

Briefly, a device in accordance with the present invention includes a helium cold head having an elongated cold finger, an inner enclosure made from relatively inert materials which is sealed around the cold finger, and an outer enclosure sealed around the inner enclosure. The outer surface of the inner enclosure is provided with a sacrificial material such as copper. The outer enclosure is provided with an inlet for receiving waste gasses and an outlet.

A thermally conductive gas can be injected into the inner enclosure to permit the heat from the inner enclosure to be conducted to the cold finger. During the regeneration of the cryotrap or pump, the thermally conductive gas can be removed from the inner enclosure by means of a vacuum pump so that wall surfaces of the inner enclosure are effectively insulated from the cold finger.

An advantage of this invention is that the helium cold head does not have to be shut down during regeneration due to the thermal switch, which greatly reduces regeneration down time because the cold head does not have to be recooled to cryogenic temperatures.

Another advantage of this invention is that the extensive plumbing, housing, and raw materials requirements of prior art nitrogen cryotraps and cryopumps have been eliminated.

Yet another advantage of this invention is that the cryotrap and cryopump can be used with highly reactive gasses such as chlorine, and that the sacrificial members can react with the hazardous reactive gasses during regeneration and somewhat during operation.

These and other objects and advantages of the present invention will no doubt become apparent upon a reading of the following descriptions and a study of the several figures of the drawing.

DETAILED DESCRIPTION OF THE PREFERRED EMBODIMENT(S)

Figure 1:
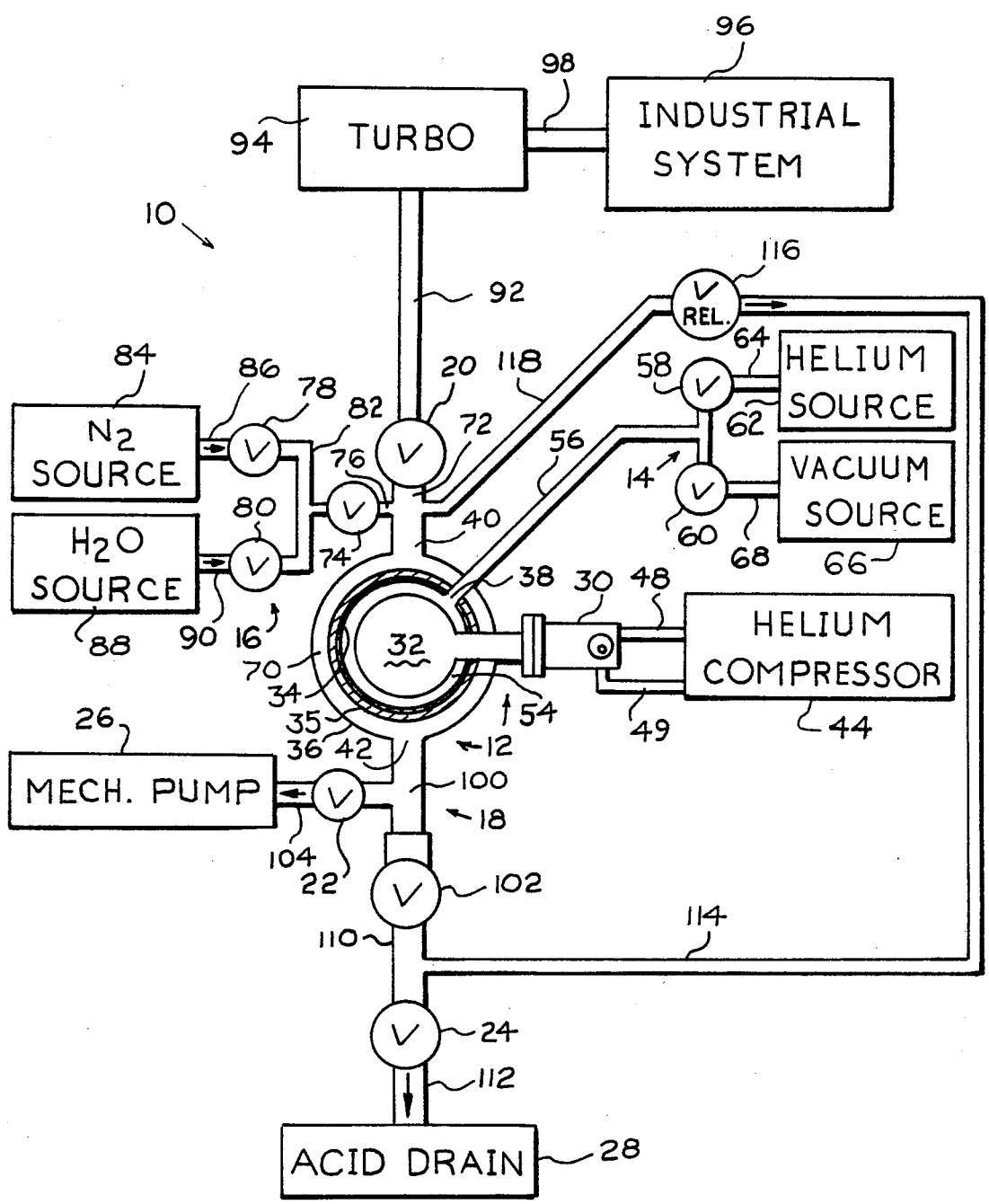
FIG. 1 is a schematic representation of a helium cryotrap in accordance with the present invention.

Referring to FIG. 1, a cryotrap system 10 in accordance with the present invention includes a trap assembly 12, thermal switch assembly 14, a flush assembly 16, and a drain assembly 18. An inlet valve 20 couples trap assembly 12 to a source of waste gasses, and outlet valves 22 and 24 couples trap assembly 12 to a mechanical pump 26 and an acid drain 28, respectively.

Trap assembly 12 includes a cold head 30, a cold finger 32 attached to the cold head 30, an inner enclosure 34 sealed around cold finger 32 and provided with a sacrificial material 35, and an outer enclosure 36 sealed around inner enclosure 34. Inner enclosure 34 is provided with an orifice 38, and outer enclosure 36 is provided with an inlet port 40 and an outlet port 42.

Helium cold head 30 is a commercially available product obtainable from several sources. For example, Air Products model number DE-202, the CTI model CT-8 cold head, and the Leybold-Heraeus model number RG-210 are all suitable for use with the present invention. Of course, other cold heads are also suitable for this and other embodiments of the present invention.

Cold head 30 is coupled to a helium compressor 44. The input of cold head 30 is coupled to the output of helium compressor 44 by a conduit 48. The helium compressor 44 provides cold head 30 with helium at approximately 250 PSI which, through an expansion process, chills the cold finger 32 to cryogenic temperatures. Heat absorbed by cold finger 32 is exchanged with the helium inside cold finger 32 and the warmed helium is returned to the helium compressor 44 via the cold head 30 and conduit 49.

Cold finger 32 extends into the plenum 54 of inner enclosure 34. Plenum 54 is coupled to a conduit 56 through orifice 38, and from there to valves 58 and 60. Valve 58 is coupled to a helium source 62 by a conduit 64, and valve 60 is coupled to a vacuum source 66 by a conduit 68. By opening valve 58 and closing valve 60, plenum 54 can be filled with helium gas. By closing valve 58 and opening valve 60 plenum 54 can be evacuated.

The plenum 70 between inner enclosure 34 and outer enclosure 36 is coupled to an intake manifold 72 by inlet port 40. A valve 74 is coupled to intake manifold 72 by a conduit 76, and is coupled to valves 78 and 80 by a Y conduit 82. Valve 78 is coupled to a nitrogen source 84 by a conduit 86, and valve 80 is coupled to a water source 88 by a conduit 90.

A conduit 92 couples the output of a turbo 94 to inlet valve 20. When inlet valve 20 is opened, conduit 92 communicates with intake manifold 72 and thus plenum 70. The inlet of turbo 94 is coupled to the waste gas output of an industrial system 96 by a conduit 98.

An exhaust manifold 100 is coupled to plenum 70 via outlet port 42, and is further coupled to valve 22 and a valve 102. Valve 22 is coupled to the input of a mechanical pump 26 by conduit 104.

One end of a conduit 110 is coupled to valve 102, and the other end of conduit 110 is coupled to outlet valve 24. Valve 24 is coupled to acid drain 28 by a conduit 112. A conduit 114 extends from a midlength portion of conduit 110 to connect to a relief valve 116. Valve 116 is coupled to intake manifold 72 by a conduit 118.

In operation, valve 58 is opened to allow inner enclosure 34 to be chilled to cryogenic temperatures via a thermal conduction through the helium within plenum 54. Inlet valve 20 and outlet valve 22 are opened and turbo 94 is actuated to inject waste industrial gasses into plenum 70 where they condense against the outer surfaces of sacrificial material 34 and the outer wall surfaces of enclosure 34.

To flush the system, valve 58 is first closed, and valve 60 is opened to evacuate plenum 54. This permits enclosure 34 to become warmed above cryogenic temperatures, and yet does not require the shutdown of cold head 30. Valves 20 and 22 are closed, and valve 74 is opened.

A dry flush is obtained by opening valve 78 to allow nitrogen to flood into plenum 70, and opening valves 102 and 24 to permit acid vapors to drain from the trap assembly 12. To wet flush the system, valves 80, 74, 102, and 24 are opened and acidic effluent is allowed to pass into the acid drain line leading to acid neutralization facilities. The sacrificial surfaces are replaced as required.

To reactivate the cryotrap system, valves 78 or 80, 74, 60, 102, and 24 are closed. Valves 20, 22, and 58 are opened and shortly after plenum 54 fills with helium, heat is conducted away from inner enclosure 34 to cold finger 32.

Figure 2:
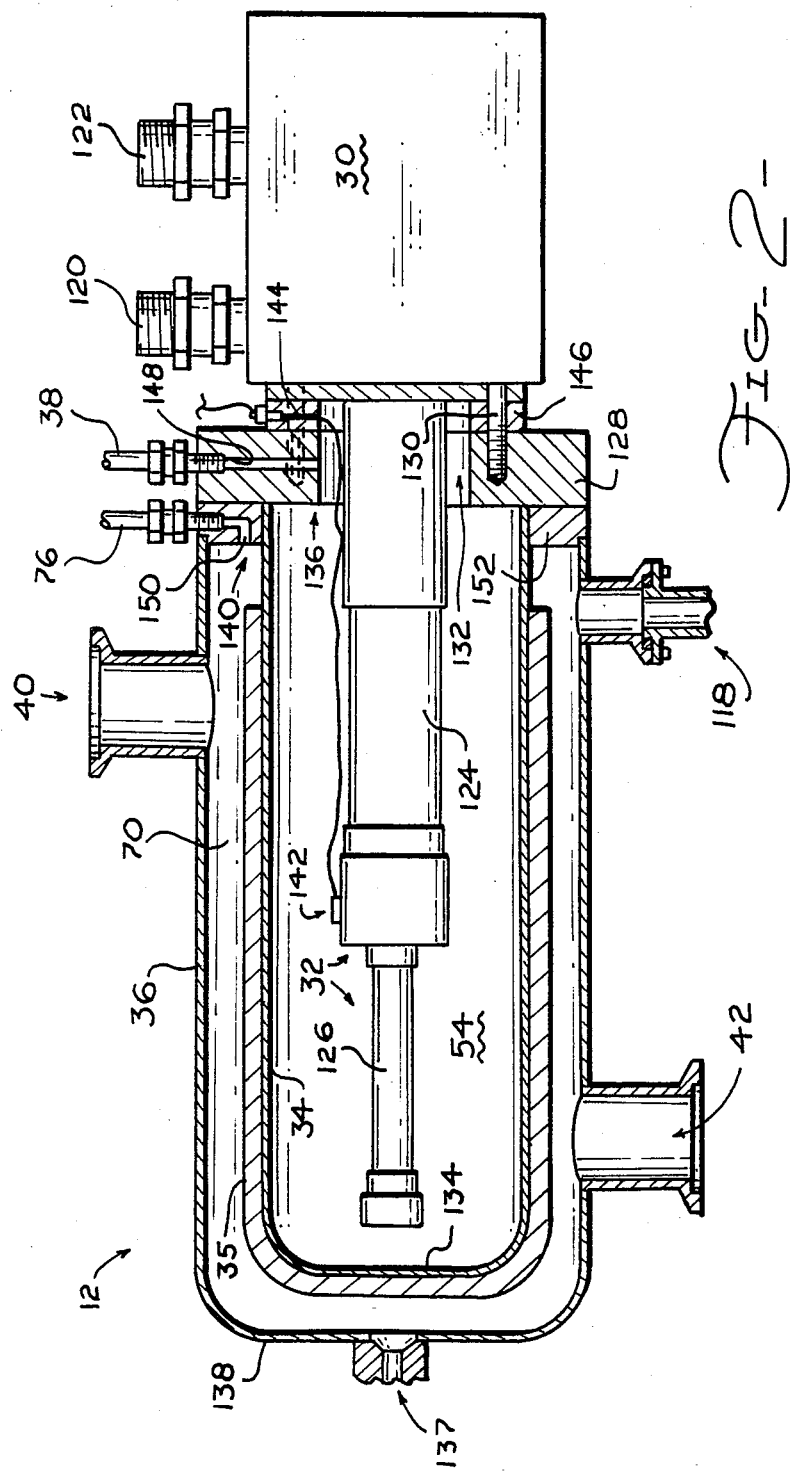
FIG. 2 is a cross sectional view of a preferred cryotrap assembly.

Referring to FIG. 2, a preferred configuration for trap assembly 12 is illustrated. As previously discussed, cold head 30 is of conventional design and can be obtained from a number of commercial sources. Cold head 30 has an input port 120 which is coupled to a compressor which provides helium at approximately 250 PSI, and an output port 122 which is coupled to the helium compressor in a return path. Extending from cold head 30 is cold finger 32 which includes a base section 124 and a tip section 126. Typically, base section 124 achieves temperatures of approximately 77° K., and tip section 126 achieves temperatures as low as 10° K.

Cold head 30 is attached to a flange 128 by bolts 130. Base section 124 of cold finger 32 extends through an aperture 132 of flange 128. Inner enclosure 34 is a hollow, cylindrical structure having a closed end 134 and an open end 136 which seals against flange 128. When the inner enclosure 134 is assembled to flange 128, a sealable plenum 54 is created.

Outer enclosure 36 is also a hollow, cylindrical shape, and is provided with an opening 137 in closed end 138. Enclosure 36 has an open end 140 which seals against flange 128. Waste gasses flow into input port 40 where they can condense against the outer surface of inner enclosure 34, and uncaptured gasses flow out of output port 42 to the mechanical pump. During the flush cycle either nitrogen or water is caused to flow into orifice 38 and out of the opening 137 in end 138.

A temperature sensor 142 such a silicon diode can be provided through a passage 144 in a flange 146. Orifice 38 communicates with plenum 54 through a passage 148 in flange 128. Conduit 76 communicates with plenum 70 via a passage 150 in a flange 152.

Figure 3:
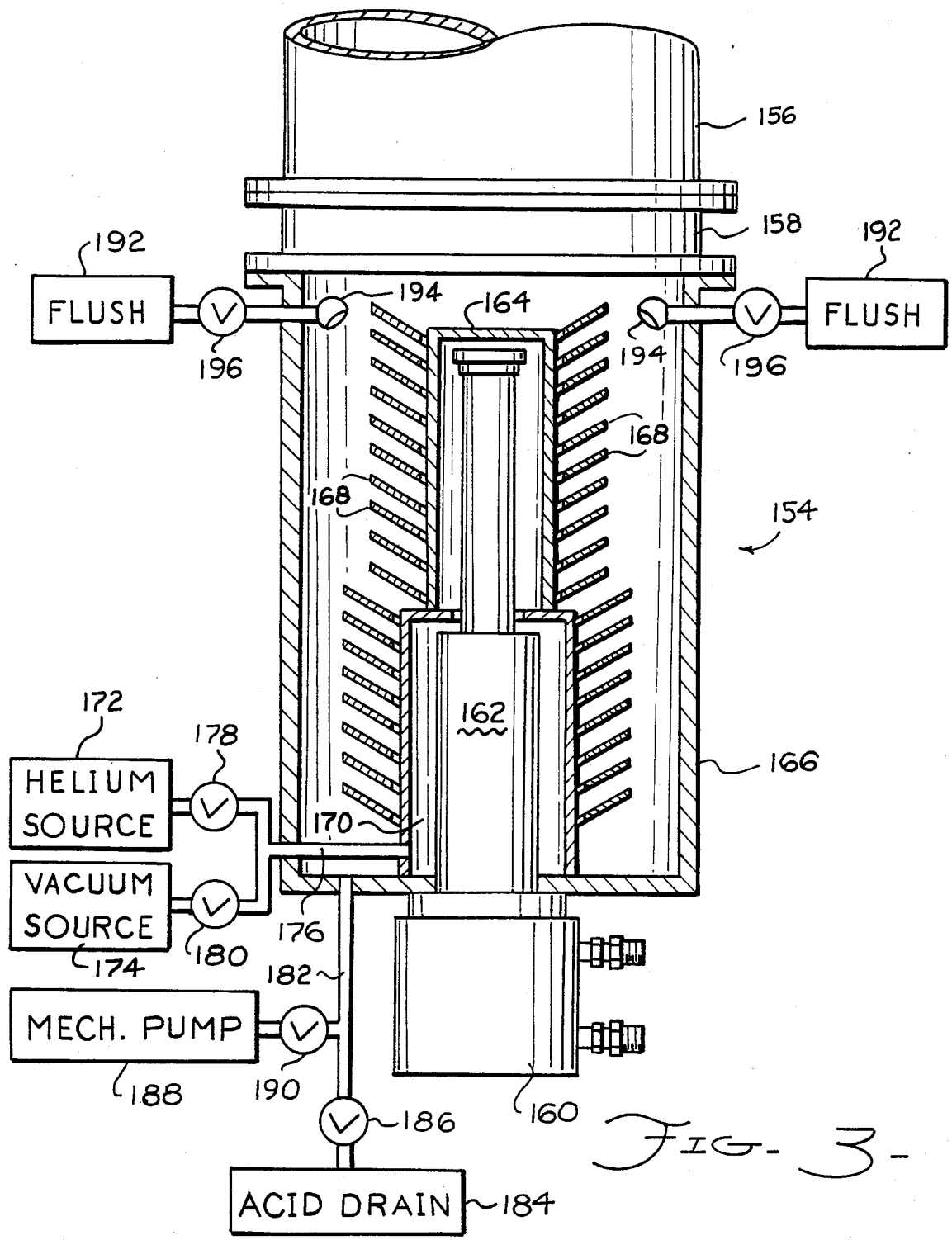
FIG. 3 is a cross-sectional view of a preferred cryopump assembly.

Referring to FIG. 3, a cryopump 154 in accordance with the present invention is coupled to an industrial system 156 by a valve 158. The cryopump 154 includes a cold head 160, a cold finger 162 coupled to cold head 160, an inner enclosure 164 surrounding cold finder 162, and an outer enclosure 166 surrounding inner enclosure 164.

Attached to the outer surface of inner enclosure 164 are a plurality of sacrificial appendages 168. Preferably, the sacrificial appendages are made from a material, such as copper, which reacts strongly with reactive industrial gasses, such as chlorine. Appendages 168 are designed to be replaceable.

A plenum 170 formed between inner enclosure 164 and cold finger 162 is coupled to either a helium source 172 or a vacuum source 174 by a conduit 176 and valves 178 and 180. A conduit 182 couples the bottom or sump of outer enclosure 166 to either an acid drain 184 via a valve 186, or to a mechanical pump 188 via a valve 190.

A flush system 192 (preferably including water and/or hot nitrogen) is coupled to flush heads 194 by means of valve assemblies 196. When valve assemblies 196 are open, a spray of water or a stream of hot nitrogen is ejected from flush heads 194 to flow over appendages 168, the outer surfaces of inner enclosure 164, and the inner surfaces of outer enclosure 166. The resulting effluent is drained through conduit 182.

The operation of the cryopump 154 is very similar to the previously described operation of cryotrap 12. Plenum 170 can be selectively filled with and evacuated of helium to provide a heat transmission path between inner enclosure 164 and cold finger 162. When plenum 170 is filled with helium and valve 158 is opened, the gaseous effluents of industrial system 156 (including reactive gasses) are trapped primarily upon appendages 168. When the appendages 168 are saturated with condensed material, valve 158 can be closed and the flush cycle may be commenced.

During the flush cycle, plenum 170 is evacuated of helium to insulate the cold finger 162 from the inner enclosure 164. The flush system 192 is activated, and the effluent is drained through conduit 182. After the flush cycle is complete, plenum 170 is once again filled with helium and valve 158 is opened.

While this invention has been described in terms of a few preferred embodiments, it is contemplated that persons reading the preceding descriptions and studying the drawing will realize various alterations, permutations and modifications thereof. It is therefore intended that the following appended claims be interpreted as including all such alterations, permutations and modifications as fall within the true spirit and scope of the present invention.

What is claimed is:

1. A cryogenic system comprising:
   a cryogenic assembly including:
   refrigeration means having a cold member capable of being chilled to cryogenic temperatures;
   an inner enclosure surrounding said cold member to provide a sealable inner chamber with said cold member within, said inner enclosure being provided with orifice means; and
   an outer enclosure surrounding said inner enclosure to provide a sealable outer chamber, said outer enclosure being provided with an inlet and an outlet communicating with said outer chamber;
   thermal switch means including:
   a source of thermally conductive fluid; and
   means for selectively injecting and removing said thermally conductive fluid into and out of said inner chamber through said orifice means; and
   flush means including:
   a source of flush fluid; and
   means coupling said source of flush fluid to said inlet of said outer enclosure.

2. A cryogenic system as recited in claim 1 further comprising temperature sensing means coupled to said refrigeration means.

3. A cryogenic system as recited in claim 1 further comprising mechanical pump means selectively coupled to said outlet of said outer enclosure.

4. A cryogenic system as recited in claim 1 wherein said thermally conductive fluid includes helium, and wherein said means for selectively injecting and removing said helium from said inner chamber include valve means for selectively coupling said orifice means to said source of helium and to a vacuum source.

5. A cryogenic system as recited in claim 1 wherein said flush means further includes a second source of flush fluid, and second means for coupling said second source of flush fluid to said inlet of said outer enclosure.

6. A cryogenic system as recited in claim 5 wherein the first source of flush fluid consists of a gas, and wherein said second source of flush fluid consists of a liquid.

7. A cryogenic system as recited in claim 1 further comprising a sacrificial material applied to at least a portion of an outer surface of said inner enclosure.

8. A cryogenic system as recited in claim 7 wherein said sacrificial material reacts vigorously with reactive gasses.

* * * * *